United States Patent
Schmidt

(10) Patent No.: US 10,532,405 B2
(45) Date of Patent: *Jan. 14, 2020

(54) SUPPORT POSTS FOR IMPROVED FLEXURAL STRENGTH IN 3D-PRINTED OBJECTS

(71) Applicant: AUTODESK, INC., San Rafael, CA (US)

(72) Inventor: Ryan Michael Schmidt, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 262 days.

This patent is subject to a terminal disclaimer.

(21) Appl. No.: 15/635,146

(22) Filed: Jun. 27, 2017

(65) Prior Publication Data

US 2017/0291371 A1    Oct. 12, 2017

Related U.S. Application Data

(63) Continuation of application No. 14/463,336, filed on Aug. 19, 2014, now Pat. No. 9,688,029.

(51) Int. Cl.
| | |
|---|---|
| G06F 7/66 | (2006.01) |
| B22F 3/105 | (2006.01) |
| G06F 17/50 | (2006.01) |
| B33Y 50/02 | (2015.01) |
| B33Y 10/00 | (2015.01) |

(52) U.S. Cl.
CPC ............ B22F 3/1055 (2013.01); G06F 17/50 (2013.01); B22F 2003/1057 (2013.01); B33Y 10/00 (2014.12); B33Y 50/02 (2014.12); G05B 2219/2646 (2013.01)

(58) Field of Classification Search
CPC .......................... B29C 67/0092; B29C 64/153
See application file for complete search history.

(56) References Cited

U.S. PATENT DOCUMENTS

| | | | | |
|---|---|---|---|---|
| 9,126,367 | B1 * | 9/2015 | Mark .................. | B29C 67/0085 |
| 2009/0174709 | A1 * | 7/2009 | Kozlak .............. | B29C 67/0055 345/420 |
| 2009/0177309 | A1 * | 7/2009 | Kozlak .............. | B29C 67/0051 700/119 |
| 2011/0178621 | A1 * | 7/2011 | Heide ................. | B29C 67/0055 700/98 |

(Continued)

OTHER PUBLICATIONS

Notice of Allowance for U.S. Appl. No. 14/463,336, dated Feb. 23, 2017.

*Primary Examiner* — Philip Wang
(74) *Attorney, Agent, or Firm* — Artegis Law Group, LLP

(57) ABSTRACT

Techniques for improving flexural strength in 3D-printed object. The techniques generally include identifying a portion of a 3D model corresponding to the 3D-printed object to which one or more support posts should be added and adding support post descriptors to the 3D model within such a portion. The support post descriptor defines a position and at least one dimension of a support post cavity and a position and at least one dimension of a support post, both having a height corresponding to at least two layers of 3D-printable material. The model, including the support post descriptors are transmitted to a 3D printer to print the 3D model, which includes a support post cavity and a support post having a height of at least two layers.

23 Claims, 6 Drawing Sheets

(56) References Cited

U.S. PATENT DOCUMENTS

| | | | |
|---|---|---|---|
| 2014/0275317 A1* | 9/2014 | Moussa | B29C 67/0081 522/72 |
| 2015/0134095 A1* | 5/2015 | Hemani | G06T 19/00 700/98 |
| 2015/0142153 A1* | 5/2015 | Chun | B29C 67/0088 700/98 |
| 2015/0154321 A1* | 6/2015 | Schmidt | B29C 67/0092 700/98 |
| 2015/0201499 A1* | 7/2015 | Shinar | H05K 3/125 425/132 |
| 2016/0243721 A1* | 8/2016 | Tew | B33Y 40/00 |
| 2017/0056138 A1* | 3/2017 | Zandinejad | A61C 13/0004 |
| 2017/0072670 A1* | 3/2017 | Tajvidi | D21H 17/25 |

* cited by examiner

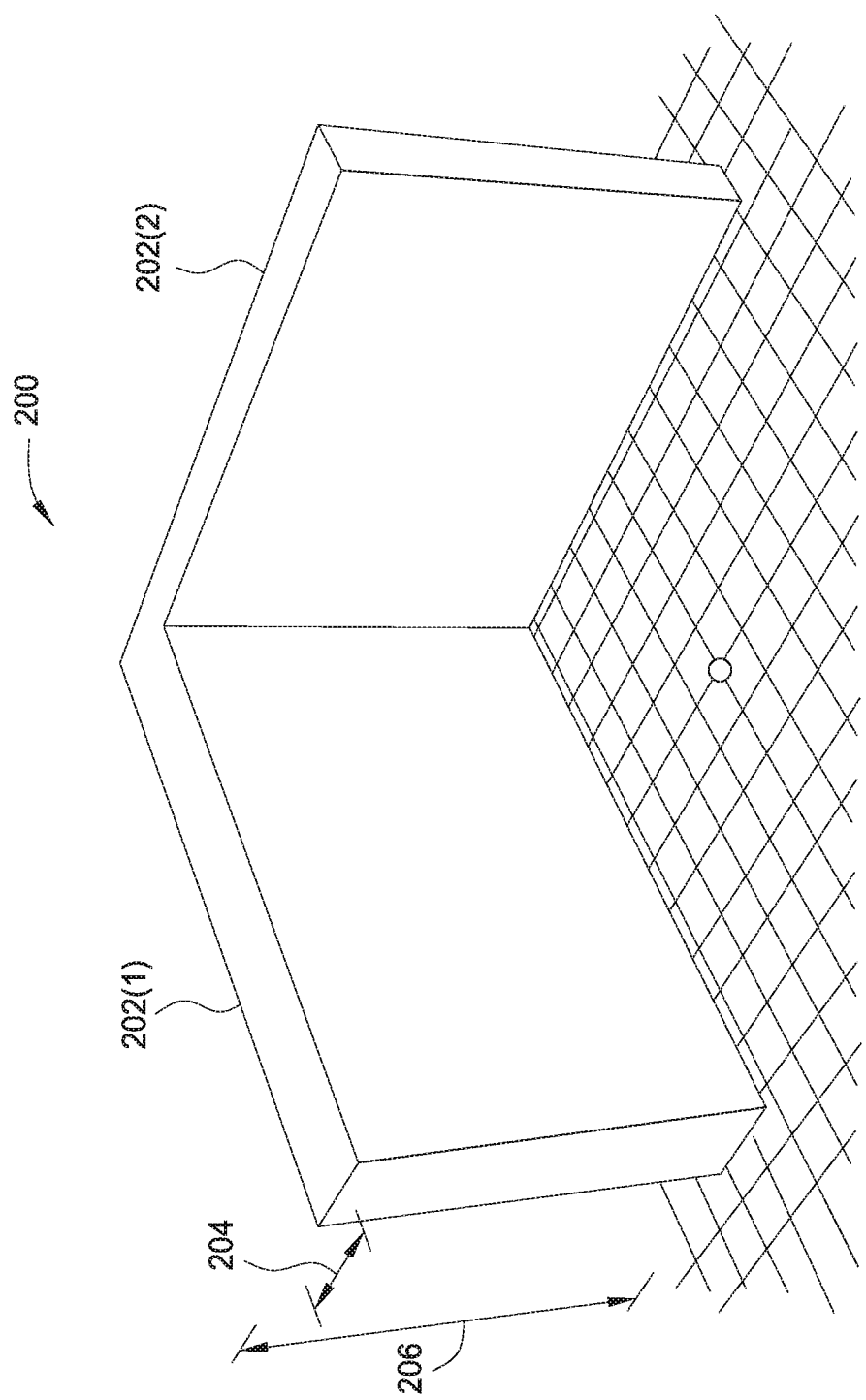

SUPPORT POSTS FOR IMPROVED FLEXURAL STRENGTH IN 3D-PRINTED OBJECTS

CROSS-REFERENCE TO RELATED APPLICATIONS

This application is a continuation of the co-pending U.S. patent application titled, "SUPPORT POSTS FOR IMPROVED FLEXURAL STRENGTH IN 3D-PRINTED OBJECTS," filed on Aug. 19, 2014 and having Ser. No. 14/463,336. The subject matter of this related application is hereby incorporated herein by reference.

BACKGROUND OF THE INVENTION

Field of the Invention

Embodiments of the present invention relate generally to three-dimensional (3D) printing and, more specifically, to implementing support posts for improved flexural strength in 3D-printed objects.

Description of the Related Art

A typical three-dimensional (3D) printer generates a 3D solid object based on a 3D printable digital model, such as a 3D mesh of triangles. In operation, the 3D printer creates the 3D object in layers. For instance, if the digital model were to represent a candy cane, then the 3D printer would print successive layers of material beginning with a layer corresponding to the bottom of the stem of the candy cane and ending with a layer corresponding to the top of the hook of the candy cane.

Some 3D printable digital models include sections that, when 3D-printed, are formed as tall stacks of narrow layers of 3D printable material. Intra-layer bonds are typically stronger than inter-layer bonds because of the nature of the 3D printing process and, thus, such tall stacks of narrow layers of 3D printable material are susceptible to bending forces. More specifically, during the 3D printing process, layers of a non-solidified 3D printable material, such as a gel or powder, are provided and then subsequently solidified to form the layer. Because the 3D printable material in a single layer is solidified together, the material in that layer generally forms strong intra-layer bonds. When the next layer is formed, the previous layer has already been solidified. Thus, the bonds between the next layer of 3D printable material and the previous layer are not as strong as the intra-layer bonds. Due to this aspect of 3D printing, portions of a 3D-printed object that include many stacked layers having cross-sections that are substantially narrower than the height of the stack typically have a weak flexural strength and may be damaged or destroyed during the printing process through bending.

To overcome this shortcoming, a human or computer program may analyze the 3D model to minimize the number of stacks of layers having cross-sections that are narrower than the height of the stack that are generated in the final 3D object printed from the 3D model. For example, a human or computer program may rotate the 3D model so that a section of the model that would otherwise be composed of a large number of small-profile layers when 3D-printed may instead composed of a single layer or a smaller number of thicker layers. However, such manipulation is tedious, difficult, and time consuming. Further, in some instances, such rotations of the 3D model being printed are not possible.

As the foregoing illustrates, what is needed in the art are techniques for improving flexural strength of 3D objects during printing.

SUMMARY OF THE INVENTION

Accordingly, embodiments are provided for generating a 3D-printed object having support posts for improved flexural strength. In one embodiment, a computer-implemented method for generating a 3D-printed object having support posts for improved flexural strengths is provided. The method includes identifying a portion of a 3D model corresponding to the 3D-printed object to which one or more support posts should be added. The method also includes for each of the one or more support posts, adding a support post descriptor to the 3D model within the portion, wherein the support descriptor defines a position and at least one dimension of a support post cavity and a position and at least one dimension of a support post, both having a height corresponding to at least two layers of 3D-printable material. The method further includes transmitting one or more instructions to a 3D printer that cause the 3D printer to print at least two layers of the 3D model, the at least two layers defining the support post cavity. The method also includes transmitting one or more instructions to the 3D printer that cause the 3D printer to generate a support post in the support post cavity.

In another embodiment, a non-transitory computer-readable medium storing instructions that, when executed by a processor, cause the processor to perform certain steps for improving the flexural strength of a 3D-printed object is provided. The steps include identifying a portion of a 3D model corresponding to the 3D-printed object to which one or more support posts should be added. The steps also include for each of the one or more support posts, adding a support post descriptor to the 3D model within the portion, wherein the support descriptor defines a position and at least one dimension of a support post cavity and a position and at least one dimension of a support post, both having a height corresponding to at least two layers of 3D-printable material. The steps further include transmitting one or more instructions to a 3D printer that cause the 3D printer to print at least two layers of the 3D model, the at least two layers defining the support post cavity. The steps also include transmitting one or more instructions to the 3D printer that cause the 3D printer to generate a support post in the support post cavity.

In another embodiment, a system for generating a 3D-printed object with improved flexural strength is provided. The system includes a processor. The processor is configured to identify a portion of a 3D model corresponding to the 3D-printed object to which one or more support posts should be added. The processor is also configured to for each of the one or more support posts, add a support post descriptor to the 3D model within the portion, wherein the support descriptor defines a position and at least one dimension of a support post cavity and a position and at least one dimension of a support post, both having a height corresponding to at least two layers of 3D-printable material. The processor is further configured to transmit one or more instructions to a 3D printer that cause the 3D printer to print at least two layers of the 3D model, the at least two layers defining the support post cavity. The processor is also configured to transmit one or more instructions to the 3D printer that cause the 3D printer to generate a support post in the support post cavity.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2A illustrates an example 3D model that is analyzed by the support post module of FIG. 1A, according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1A:
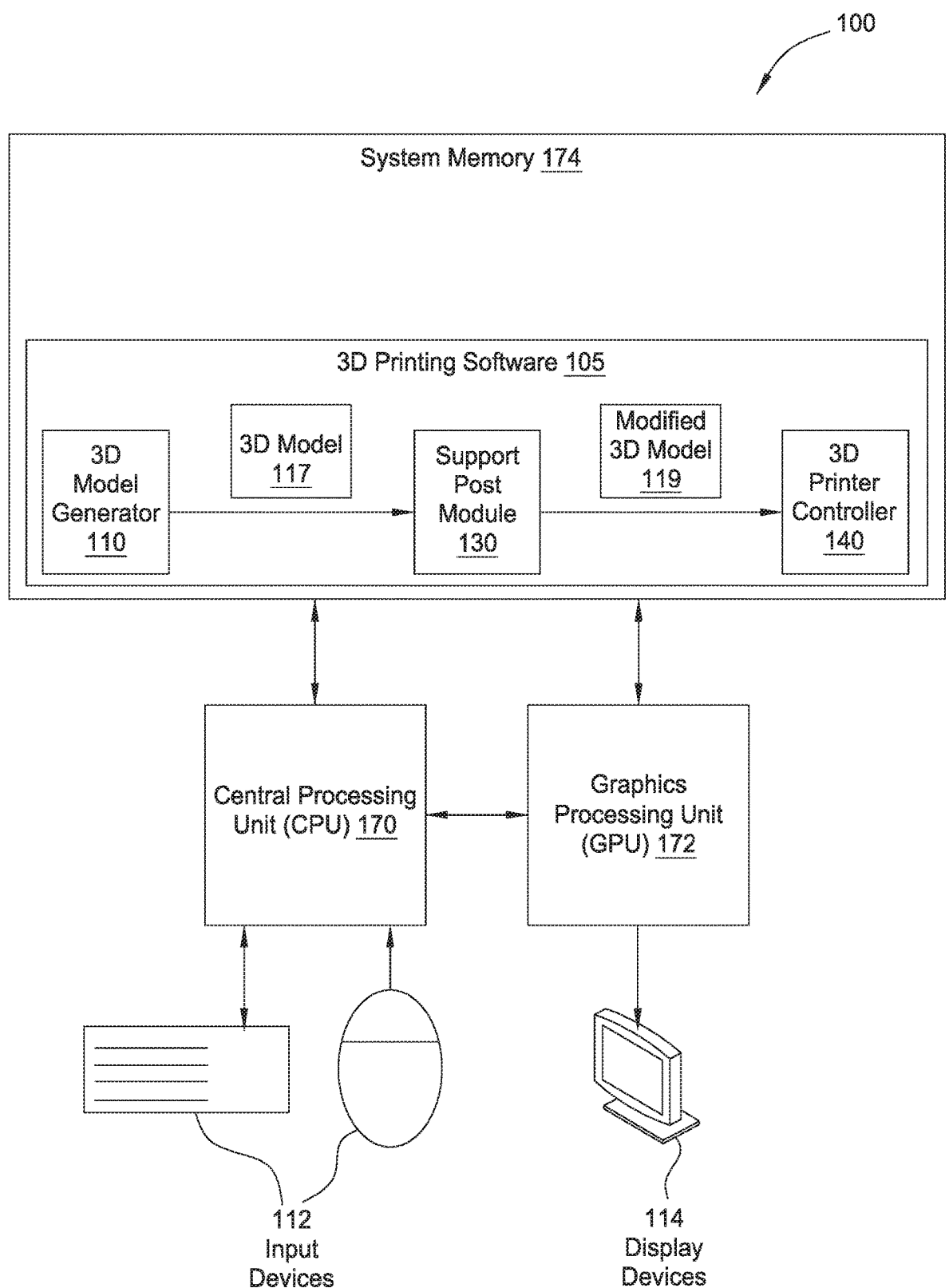
FIG. 1A is a block diagram illustrating a computer system configured to implement one or more aspects of the present invention.

FIG. 1A is a block diagram illustrating a computer system 100 configured to implement one or more aspects of the present invention. As shown, the computer system 100 includes, without limitation, a central processing unit (CPU) 170, a system memory 150, a graphics processing unit (GPU) 172, input devices 112, and a display device 114.

In operation, the CPU 170 is the master processor of the computer system 100, controlling and coordinating operations of other system components. In particular, the CPU 170 issues commands that control the operation of a 3D printer (discussed below with respect to FIG. 1B) and the GPU 172. The GPU 172 incorporates circuitry optimized for graphics and video processing, including, for example, video output circuitry that delivers pixels to the display device 114. The display device 114 may be any conventional cathode ray tube, liquid crystal display, light-emitting diode display, or the like. The CPU 170 receives user input information from the input devices 112, such as a keyboard or a mouse.

The system memory 174 stores content, such as software applications and data, for use by the CPU 170 in controlling the 3D printer. As shown, the system memory 174 includes 3D printing software 105. The 3D printing software 105 includes a 3D model generator 110, a support post module 130, and a 3D printer controller 140. In some embodiments, the 3D model generator 110, the support post module 130, and the 3D printer controller 140 may be embodied as software that execute on the CPU 170, the GPU 172, or any combination of the CPU 170 and the GPU 172, as hardware, or as a combination of software and hardware.

The 3D model generator 110 enables specification of a 3D model 117. The 3D model generator 110 may be implemented in any technically feasible fashion. For instance, the 3D model generator 110 may include computer aided design (CAD) software. Such CAD software often includes a graphical user interface that converts designer input such as symbols and brush stroke operations to geometries in the 3D model 117. Alternatively the 3D model generator 110 may be 3D scanning software that is coupled to a 3D scanner (not shown) that together analyzes an existing 3D solid object to create the 3D model 117 as a digital template for creation of copies of the existing 3D solid object.

The 3D model 117 describes a desired 3D object. The 3D model 117 may conform to any 3D printable format as known in the art. For instance, in some embodiments the 3D model 117 may capture unit normals and vertices that define the 3D solid object in the stereo-lithography format. In alternate embodiments, the 3D model 117 may capture a 3D mesh of interconnected triangles that define the 3D solid object in the collaborative design activity (COLLADA) format.

As shown, the 3D model generator 110 is coupled to the support post module 130. This coupling may be implemented in any technically feasible fashion, such as exporting the 3D model 117 from the 3D model generator 110 and then importing the 3D model 117 to the support post module 130.

The support post module 130 analyzes the 3D model 117 and generates support posts descriptors for the 3D model, to create modified 3D model 119. Support post descriptors are included in the modified 3D model 119 in order to improve the flexural strength of portions of a 3D object printed based on the 3D model. These support post descriptors and the effect that these descriptors have on the 3D model 117 and the resultant 3D printed object are described in more detail below with respect to FIGS. 2A-4.

As shown, the support post module 130 is coupled to the 3D printer controller 140. This coupling may be implemented in any technically feasible fashion, such as exporting the modified 3D model 119 from the support post module 130 and then importing the modified 3D model 119 to the 3D printer controller 140.

The 3D printer controller 140 controls the 3D printer to fabricate a 3D-printed object having support posts based on the modified 3D model 119. The 3D printer controller 140 may be a device driver or a component of an application program integrated with 3D model generator 110 and/or support post module 130 that communicates with and instructs a device driver in order to control the 3D printer to fabricate the 3D-printed object. The 3D printer controller 140 may also be software and/or hardware that communicates via a computer network with another computer to control a remote 3D printer to fabricate the 3D-printed object.

In some embodiments, the 3D model generator 110, the support post module 130, and/or the 3D printer controller 140 are integrated into any number (including one) of software applications. In some embodiments, the 3D model generator 110, the support post module 130, and/or the 3D printer controller 140 may be provided as an application program (or programs) stored on computer readable media such as a CD-ROM, DVD-ROM, flash memory module, or other tangible storage media.

The components illustrated in the computer system 100 may be included in any type of computer system 100, e.g., desktop computers, server computers, laptop computers, tablet computers, and the like. Additionally, software applications illustrated in computer system 100 may execute on distributed systems communicating over computer networks including local area networks or large, wide area networks, such as the Internet. Notably, the 3D model generator 110, the support post module 130, and the 3D printer controller 140 described herein are not limited to any particular computing system and may be adapted to take advantage of new computing systems as they become available.

It will be appreciated that the computer system 100 shown herein is illustrative and that variations and modifications are possible. The number of CPUs 170, the number of GPUs 172, the number of system memories 174, and the number of applications included in the system memory 174 may be modified as desired. Further, the connection topology between the various units in FIG. 1 may be modified as desired.

Figure 1B:
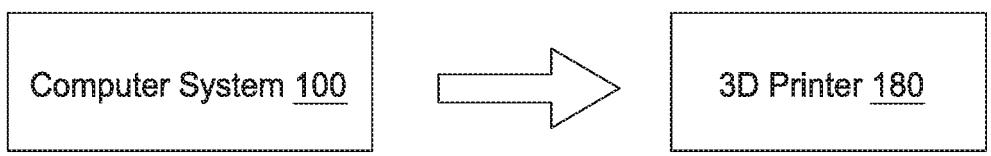
FIG. 1B is a block diagram illustrating the computer system of FIG. 1A coupled to a 3D printer.

FIG. 1B is a block diagram illustrating the computer system 100 of FIG. 1A, coupled to a 3D printer 180, according to one embodiment of the present invention. As shown, the computer system 100 is coupled to and controls the 3D printer 180.

The 3D printer 180 is any device capable of printing a 3D object based on a 3D model (such as modified 3D model 119). The 3D printer 180 may be configured to build-up any type of 3D object in any technically feasible fashion. Generally speaking, the 3D printer 180, at the direction of 3D printer controller 140 (included in system memory 174, discussed below), builds 3D objects in a layer-by-layer fashion. For any particular layer, the 3D printer 180 solidifies 3D-printable material to conform to the shape of that layer. The 3D printer 180 repeats this process for each layer of the 3D-printed object.

The 3D printer 180 may implement one of several different 3D printing technologies in order to generate the 3D-printed object. In one example 3D printing technology, referred to as fused deposition modeling ("FDM"), the 3D printer 180 extrudes plastic in layers to form an object based on the provided 3D model. In another example 3D printing technology, referred to as photopolymer printing, a 3D printer 180 sprays layers of a photopolymer material, curing these layers after each layer is deposited. In a further example 3D printing technology, referred to as metal sintering, a metal powder is deposited and then selectively melted to generate solid regions based on the provided 3D model. The metal powder may also instead be a plastic powder or a powder of a different material. Other layer-based 3D printing techniques are also generally known.

The connection between the computer system 100 and the 3D printer 180 may be made in a variety of ways. For example, the computer system 100 may be coupled to the 3D printer 180 via a local connection, such as a universal serial bus (USB), parallel port, or other known connection types. The computer system 100 may also be coupled to the 3D printer 180 via a network connection, and the 3D printer may be located in a geographically distant location from the computer system 100. In such a situation, the computer system 100 may be a server that receives requests from a client computer that is locally coupled to the 3D printer 180. In response to those requests, the computer system 100 may provide instructions to the client computer to transmit to the 3D printer 180 for controlling the 3D printer 180 to generate a 3D model.

FIG. 2A illustrates an example 3D model 200 that is analyzed by the support post module 130 of FIG. 1A, according to one embodiment of the present invention. As shown, the 3D model 200 includes a first angled section 202(1) and a second angled section 202(2).

Because the 3D model 200 is relatively narrow in a first direction 204 that is perpendicular to a vertical direction 206, a 3D-printed object generated based on the 3D model 200 may be weak to flexural stresses. More specifically, because the first angled section 202(1) and second angled section 202(2) are tall and narrow, a 3D-printed object generated based on 3D model 200 may be susceptible to flexural forces. This susceptibility to flexural forces is due to the fact that the strength of inter-layer bonds (bonds between layers, as opposed to between material within the same layer) is generally significantly lower than the strength of the intra-layer bonds (bonds between material within a particular layer). Intra-layer bonds are generally stronger than inter-layer bonds because of the order in which the 3D printer 180 prints the 3D object. More specifically, the 3D printer 180 solidifies the material in a single layer at generally the same time. When the 3D printer 180 proceeds to the next layer, the material of the first layer is already solidified. The strength of a bond between the solidified material and the new material of the next layer is lower than the strength of the bond between the solidified material in the first layer. As discussed above, where a 3D-printed object, such as 3D model 200, would have a stack of layers narrow with a cross-section substantially smaller than the height of the stack, the 3D-printed object would benefit from the support posts described above.

Figure 2B:
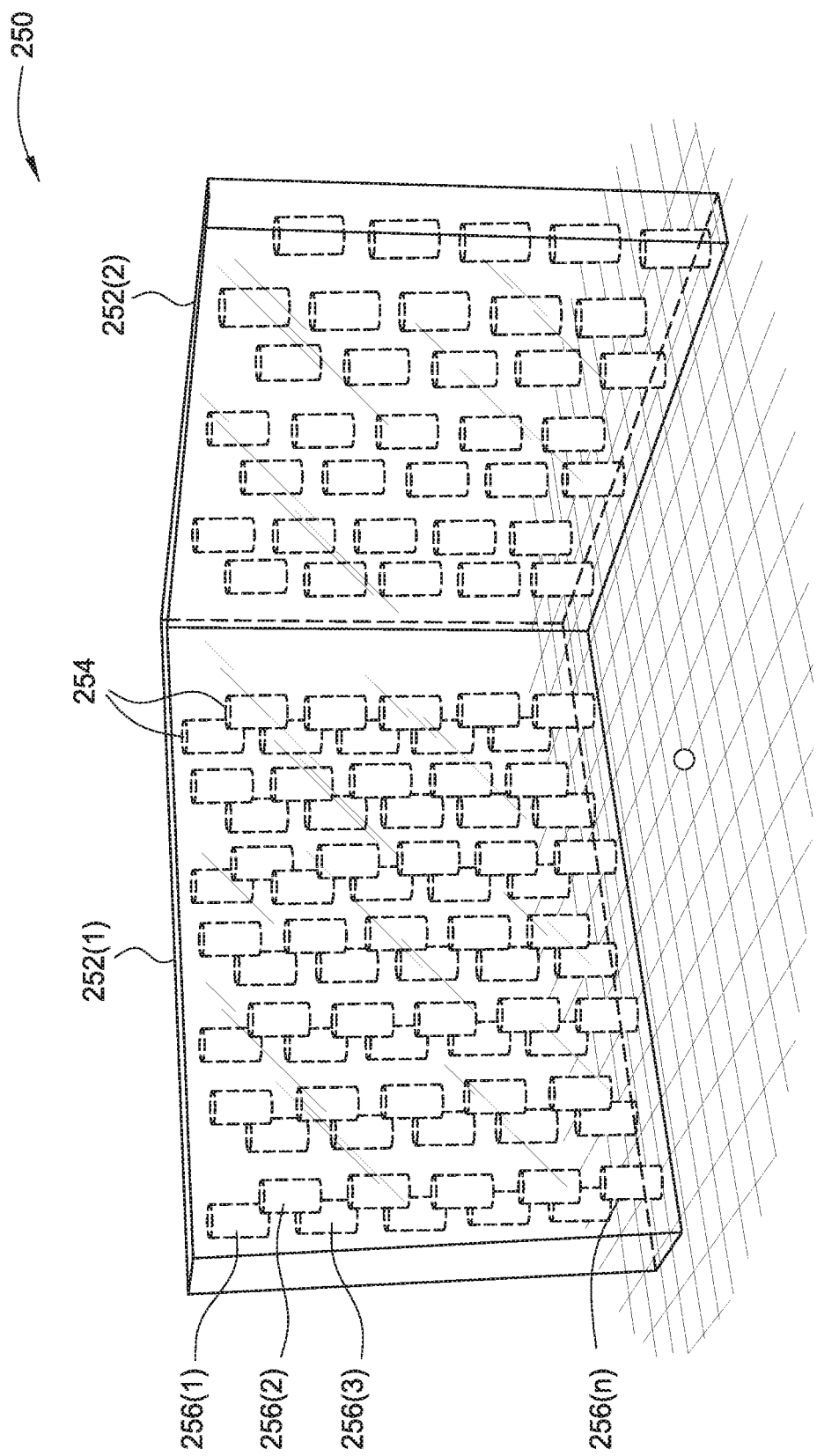
FIG. 2B illustrates a modified 3D model in which support post descriptors have been added to the 3D model of FIG. 2A, according to one embodiment of the present invention.

FIG. 2B illustrates a modified 3D model 250 in which support post descriptors 254 have been added to the 3D model 200 of FIG. 2A, according to one embodiment of the present invention. As shown, the modified 3D model 250 includes a first angled section 252(1), a second angled section 252(2), and the support post descriptors 254.

To address the issues described above, when the support post module 130 receives the 3D model 200 from the 3D model generator 110, the support post module 130 creates modified 3D model 250 including support post descriptors to increase the flexural strength of a 3D object that results from 3D-printing the modified 3D model 250. The support post descriptors 250 include two elements: a support post cavity, and the support post that fills that cavity. The support post cavity is a "hole" that the support post module 130 inserts into the 3D model 200 so that a support post may fit in that hole. To insert this support post cavity, the support post module 130 designates a portion of the 3D model 200 as empty space so that the 3D printer 180 does not solidify 3D printable material in the standard layer-by-layer fashion within that empty space. The support post is a block of material that occupies the support post cavity and provides the flexural strength referred to above. Each support post cavity and support post has a height that is at least two layers in thickness.

The 3D printer 180 generates the support post in a different manner than the manner in which the 3D printer 180 normally generates layers for a 3D-printed object. More specifically, instead of solidifying the support post layer-by-layer, the 3D printer 180 solidifies the entire support post, which has a height of more than one layer, at the same time. Because these support posts occupy more than one layer, the support posts do not exhibit the typical inter-layer weaknesses of a 3D printed object that would occur if the space occupied by the support posts were instead simply occupied by multiple layers of 3D printing material. More specifically, because the support posts occupy more than one layer, the support posts structurally resist flexural stresses to which tall, stacks of layers having cross-sections that are substantially narrower than the height of the stacks are generally susceptible.

To add the support post descriptors to the 3D model, the support post module 130 first analyzes the provided 3D model to identify portions of the 3D model that would be amenable to support posts. Such portions generally include parts of the 3D model for which a measurement in a first dimension (e.g., z) is large in comparison with measurements in second and third perpendicular dimensions (e.g., x and y).

Once the support post module 130 identifies such portions, the support post module 130 adds support post descriptors to the 3D model. The support post module 130 may arrange the support post descriptors in various layouts. In one example, the support post module 130 generates "levels" of support post descriptors, where each level extends from one vertical position to another vertical position (where vertical positions are defined relative to the top and bottom of the support posts). The number of levels of support posts depends on the height of each support post and the height of the portion of the 3D model for which support posts are desired. Within each level, the support posts generally occupy the same vertical space. More specifically, the bottom and top of each support post in a level generally line up. Within each level, the support posts may also be "staggered." In one example, the support posts may be arranged in a circle packing pattern but with some solidified 3D printing material between each support post (as opposed to each support post completely touching). The thickness of the material in each support post may be determined based on, for example, the strength of the solidified material and the geometry of the final 3D object. Additionally, in one example, levels of support post descriptors are arranged such that there are support post descriptors at each vertical position within the 3D model.

The support post descriptors in the modified 3D model 250 of FIG. 2B are arranged in several levels 256 and are staggered within each level. Further, levels are overlapping in a vertical direction so that a support post exists at every vertical position within the 3D model. For example, first level 256(1) is at the top-most position within the modified 3D model 250 and third level 256(3) is directly below first level 256(1). Second level 256(2) is in between the top of first level 256(1) and the bottom of third level 256(3), which causes the vertical space between first level 256(1) and third level 256(3) to be occupied by support post descriptors 254.

Figure 3:
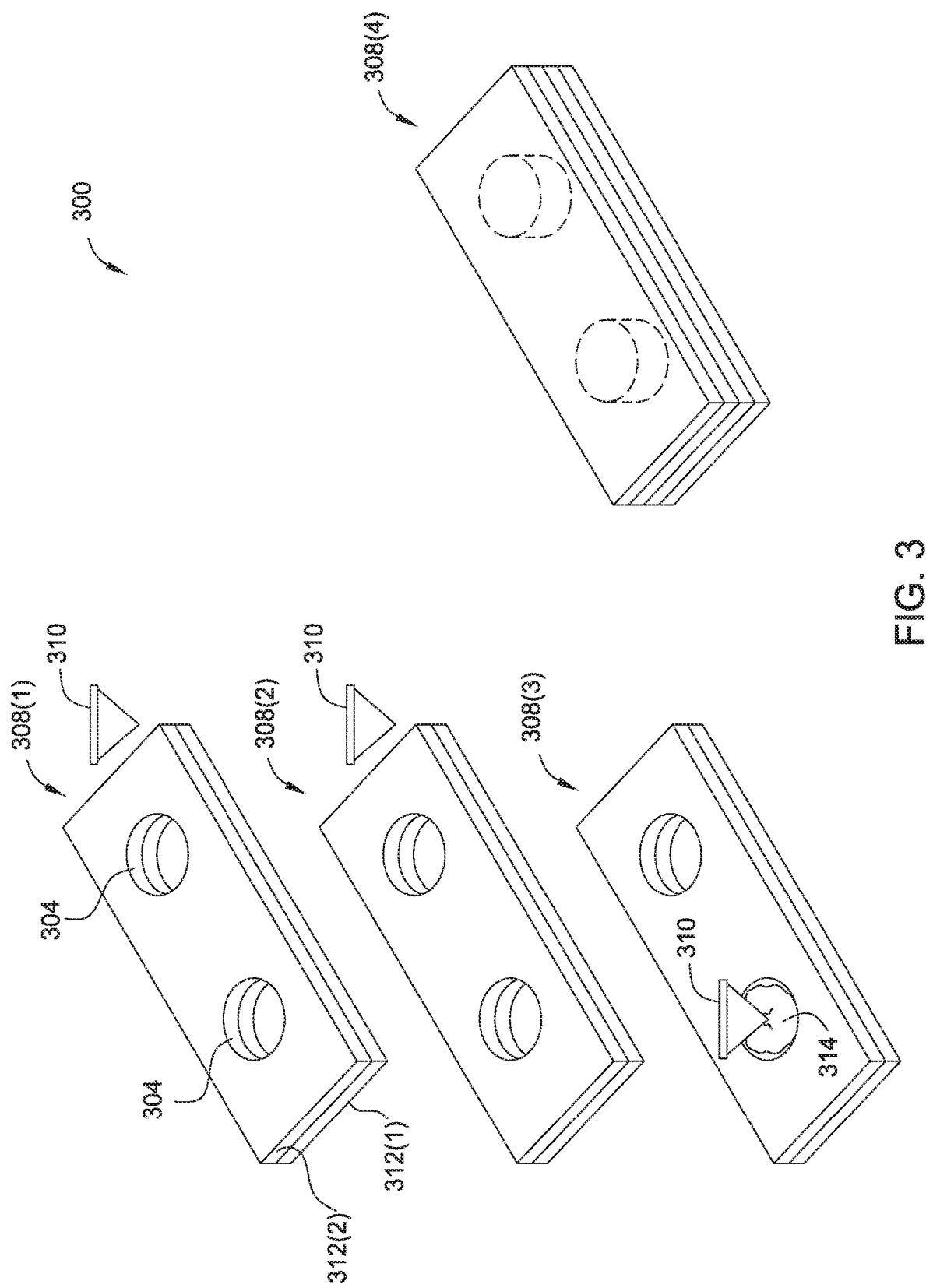
FIG. 3 illustrates a technique for fabricating a 3D-printed object with support posts to enhance flexural strength, according to one embodiment of the present invention.

FIG. 3 illustrates a technique for fabricating a 3D-printed object 300 with support posts to enhance flexural strength, according to one embodiment of the present invention. As shown, the technique includes a series of stages whereby the 3D-printed object is fabricated in a layer-by-layer manner. Support post cavities 304, which are part of the layer-by-layer description of the 3D-printed object, and support posts 306, are added to the 3D-printed object 300 during fabrication as shown.

Generally, to print the 3D object from the modified 3D model 119, the 3D printer controller 140 transmits certain instructions to the 3D printer 180. These instructions include instructions to print each layer normally, with no material included in the support post cavities. The instructions also include instructions to solidify material within the cavity when the 3D printer 180 has printed the final layer (i.e., upper-most) for a cavity. In this way, the 3D object is built from the modified 3D model 119 as normal, and support posts having thicknesses equal to that of at least two layers are included as specified by the support post module 130.

In the example illustrated in FIG. 3, in a first stage 308(1), print head 310 has printed a first layer 312(1) and a second layer 312(2). The second layer 312(2) defines support post cavities 304. In second stage 308(2), print head 310 has printed first layer 312(1), second layer 312(2), and third layer 312(3). The second layer 312(2) and third layer 312(3) both define support post cavities 304. In third stage 308(3), after the 3D printer controller 140 determines that the support post cavities 304 are fully constructed—that the top-most layer associated with a particular support post cavity 304 has been deposited—the 3D printer controller 140 instructs the 3D printer 180 to solidify a support post 314 within the support post cavities 304. As described below, the manner in which the support post 314 is solidified depends on the 3D printing technology. In the fourth stage 308(4), print head 310 has printed a fourth layer above the support post cavity 304, meaning that the support post 314 is enclosed within the support post cavity 304.

The techniques for creating the support posts may vary based on the 3D printing technology. For example, for fused deposition modeling ("FDM"), the 3D printer 180 prints layers up to the top of a particular cavity and then deposits FDM material into the cavity. With FDM, in normal operation, the print head of the 3D printer 180 is typically touching a previous layer (i.e., the layer upon which the current layer is being deposited). To form a support post within a support post cavity, the 3D printer 180 raises the print head above the top of the previous layer and above the support post cavity, so that the print head deposits 3D printing material into the support post cavity. As the FDM material cools within the support post cavity, the support post is formed. Because the support post is deposited all at once, the support post is formed that does not have the inter-layer weaknesses of layers of material that would otherwise fill the cavity.

For photopolymer printing, once the last layer of a cavity has been deposited, the 3D printer 180 sprays the photopolymer material into the cavity and subsequently cures the photopolymer material within the cavity. Again, because the material in a cavity that spans multiple layers is cured all at once, a support post is formed that is stronger than if the space corresponding to the cavity had instead been filled in a layered manner.

For metal sintering, as described above, layers of powder are selectively solidified based on the shape for a particular layer. Powder that is not solidified remains in place in an unsolidified form and is typically removed after the 3D object has completed printing. To form support posts, after all layers that surround a cavity have been solidified (except the layer that covers the cavity), the unsolidified powder that exists in a cavity is solidified together, forming a support post.

In some embodiments, the material injected into the cavities may be different from the material that forms the layers of the 3D object. For example, the material may be an epoxy material that has stronger bonding characteristics than the material that forms the layers.

Figure 4:
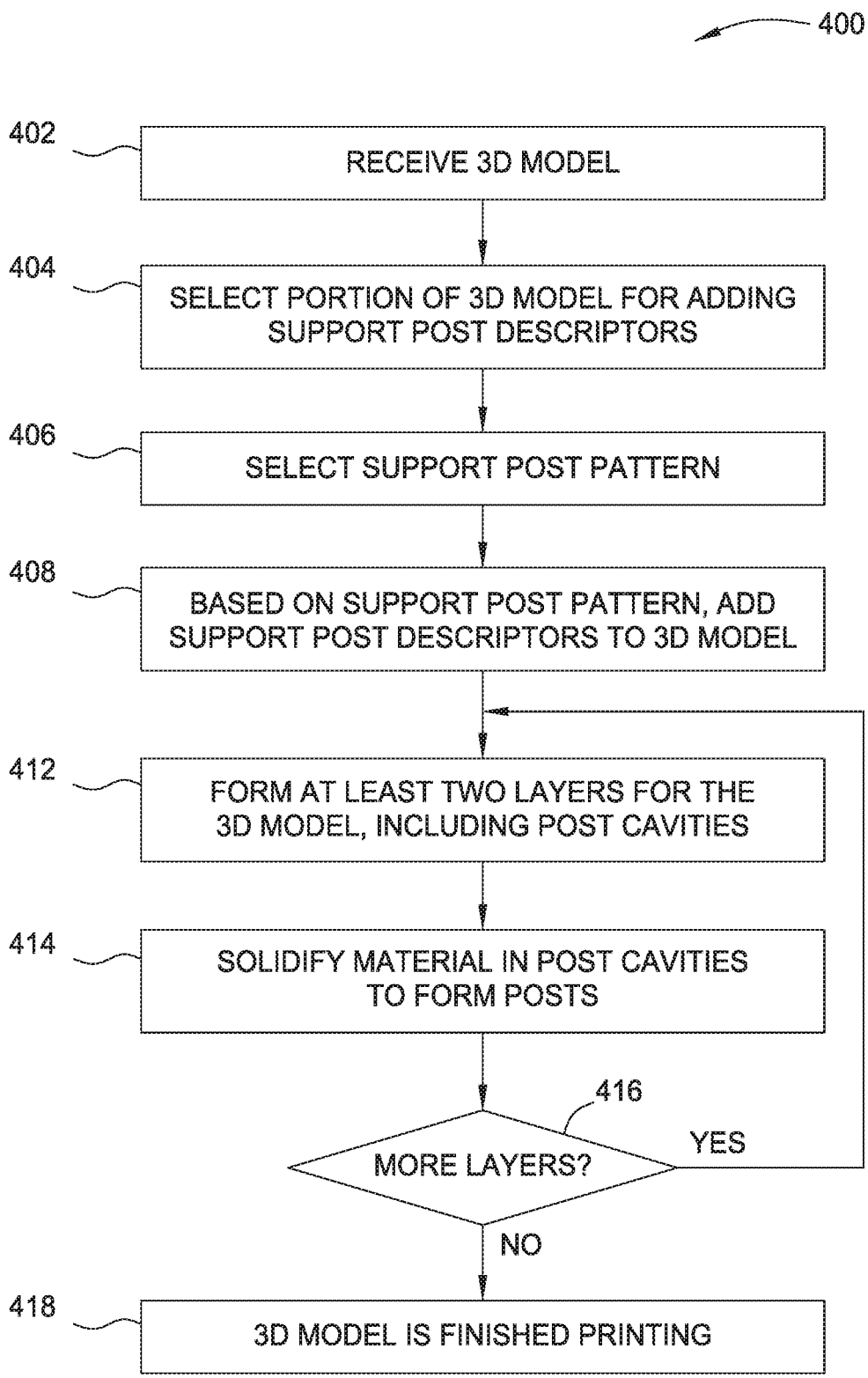
FIG. 4 is a flow diagram of method steps for generating a 3D-printed object having support posts for providing flexural strength, according to one embodiment of the present invention.

FIG. 4 is a flow diagram of method steps for generating a 3D-printed object having support posts for providing flexural strength, according to one embodiment of the present invention. Although the method steps are described in conjunction with the systems of FIGS. 1-3, persons skilled in the art will understand that any system configured to perform the method steps, in any order, falls within the scope of the present invention.

As shown, a method 400 begins at step 402, where a support post module 130 receives a 3D model 117 for analysis. At step 404, the support post module 130 selects a portion of the 3D model 117 for adding support post descriptors. As described above, portions of a 3D model 117 that include stacks of layers of 3D printable material having a cross-section that is substantially narrower than the height of the stacks are suitable for adding support posts. At step 406, the support post module 130 selects a support post pattern. The support post pattern generally consists of the pattern with which support posts are laid out within the 3D model 117. As described above, one example support post pattern includes a staggered support post pattern. This staggered support post pattern may be a packed circular pattern, with a threshold amount of 3D-printable material between the circles of the packed circular pattern.

At step 408, the support post module 130 adds support post descriptors to the 3D model 117 to generate a modified 3D model 119. In the 3D model, these support post descriptors generally consist of a cavity having the size and location corresponding to the associated support post, as well as an indication to create a support post within that cavity. As described below, the 3D printer 180 responds to the indications to create the support posts by performing appropriate operations to create the support posts that have a height of at least two layers.

At step 412, the 3D printer controller 140 controls the 3D printer 180 to generate layers based on the modified 3D model 119, forming at least two layers for the 3D model, where those layers include cavities for the support posts. The 3D printer 180 solidifies each layer as usual after being laid down. Once the at least two layers are solidified in this manner, the 3D printer 180 solidifies material within the cavity. As described above, the manner in which this solidification is done depends on the 3D printing technology used. For example, for FDM, a plastic material is deposited into the cavity and allowed to solidify. For photopolymer printing, photopolymer material is sprayed into the cavity and cured with an ultraviolet light. For metal sintering (or sintering with non-metal materials), the powder that is in the cavity is solidified by heating, usually with a laser.

At step 416, the 3D printer controller 140 determines whether there are more layers left to print. If there are more layers, then the method 400 returns to step 412. If there are no more layers, then the method proceeds to step 418, where the 3D printer controller 140 determines that the 3D printing process is complete.

In sum, a computer system coupled to a 3D printer is configured to generate 3D objects including support posts. The computer system is configured to analyze a model of a 3D object, to identify portions of the 3D model that require support posts, and to add support post descriptors to the 3D model. The support post descriptors include cavities in the analyzed 3D model and indicators to add support posts to the 3D object generated by a 3D printer. To generate the cavities, which are simply represented as holes in the 3D model of appropriate size, shape, and position, the 3D printer simply prints the 3D model as normal. To generate the support posts, the 3D printer solidifies 3D printable material within the cavities to form support posts that are a generally solidified piece of the 3D printable material that is at least two layers in height. The support post descriptors may be included in the 3D model in patterns and in levels to provide support throughout the 3D object.

Advantageously, such a solidified piece of 3D printable material provides support in a narrow cross-sectioned, vertical section of a 3D model to resist flexural forces. Such resistance provides strength to tall, narrow portions of models. Additionally, arranging the support posts in support post patterns provides this resistance throughout the cross-section of such narrow, vertical sections. Further, arranging the support posts in levels provides this resistance through a vertical cross-section of the 3D model.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method, comprising:
   identifying a portion of a 3D model corresponding to a 3D-printed object to which a support post should be added;
   adding a support post descriptor to the 3D model that defines a position and at least one dimension of a support post cavity; and
   transmitting one or more instructions to a 3D printer that cause the 3D printer to print at least two layers of the 3D model that define the support post cavity and to generate the support post in the support post cavity.

2. The method of claim 1, wherein transmitting one or more instructions to the 3D printer that cause the 3D printer to print the at least two layers and to generate the support post comprises transmitting one or more instructions that cause the 3D printer to deposit a deposition modeling material into the support post cavity and allow the deposition modeling material to solidify before 3D printing a subsequent layer.

3. The method of claim 1, wherein transmitting one or more instructions to the 3D printer that cause the 3D printer to print the at least two layers and to generate the support post comprises transmitting one or more instructions that cause the 3D printer to deposit a photopolymer material into the support post cavity and direct ultraviolet light at the deposited photopolymer printing material to cure the photopolymer printing material.

4. The method of claim 1, wherein transmitting one or more instructions to the 3D printer that cause the 3D printer to print the at least two layers and to generate the support post comprises transmitting one or more instructions that cause the 3D printer to heat sintering powder remaining in the support post cavity after printing the at least two layers.

5. The method of claim 1, wherein the support post descriptor further defines a position and at least one dimension of a support post.

6. The method of claim 5, wherein both the support post cavity and the support post have heights corresponding to at least two layers of 3D-printable material.

7. The method of claim 1, wherein transmitting one or more instructions to the 3D printer that cause the 3D printer to print the at least two layers and to generate the support post comprises transmitting one or more instructions that cause the 3D printer to print the at least two layers with a fused deposition modeling technique.

8. The method of claim 1, wherein transmitting one or more instructions to the 3D printer that cause the 3D printer to print the at least two layers and to generate the support post comprises transmitting one or more instructions that cause the 3D printer to print the at least two layers with a photopolymer printing technique.

9. The method of claim 1, wherein transmitting one or more instructions to a 3D printer that cause the 3D printer to print the at least two layers and to generate the support post comprises transmitting one or more instructions that cause the 3D printer to print the at least two layers with a sintering technique.

10. The method of claim 1, further comprising:
adding a plurality of support post descriptors to the 3D model, the plurality of support post descriptors being arranged in a staggered formation; and
transmitting one or more instructions to the 3D printer that cause the 3D printer to generate a plurality of support posts and support post cavities based on the plurality of support post descriptors.

11. The method of claim 10, wherein the staggered formation comprises a circle packing pattern with a threshold thickness of 3D printing material between each support post.

12. One or more non-transitory computer-readable media storing instructions that, when executed by one or more processors, cause the one or more processors to perform the steps of:
identifying a portion of a 3D model corresponding to a 3D-printed object to which a support post should be added;
adding a support post descriptor to the 3D model that defines a position and at least one dimension of a support post cavity; and
transmitting one or more instructions to a 3D printer that cause the 3D printer to print at least two layers of the 3D model that define the support post cavity and to generate the support post in the support post cavity.

13. The one or more non-transitory computer-readable media of claim 12, wherein transmitting one or more instructions to the 3D printer that cause the 3D printer to print the at least two layers and to generate the support post comprises transmitting one or more instructions that cause the 3D printer to deposit a deposition modeling material into the support post cavity and allow the deposition modeling material to solidify before 3D printing a subsequent layer.

14. The one or more non-transitory computer-readable media of claim 12, wherein transmitting one or more instructions to the 3D printer that cause the 3D printer to print the at least two layers and to generate the support post comprises transmitting one or more instructions that cause the 3D printer to deposit a photopolymer material into the support post cavity and direct ultraviolet light at the deposited photopolymer printing material to cure the photopolymer printing material.

15. The one or more non-transitory computer-readable media of claim 12, wherein transmitting one or more instructions to the 3D printer that cause the 3D printer to print the at least two layers and to generate the support post comprises transmitting one or more instructions that cause the 3D printer to heat sintering powder remaining in the support post cavity after printing the at least two layers.

16. The one or more non-transitory computer-readable media of claim 12, wherein the support post descriptor further defines a position and at least one dimension of a support post.

17. The one or more non-transitory computer-readable media of claim 16, wherein both the support post cavity and the support post have heights corresponding to at least two layers of 3D-printable material.

18. The one or more non-transitory computer-readable media of claim 12, wherein transmitting one or more instructions to the 3D printer that cause the 3D printer to print the at least two layers and to generate the support post comprises transmitting one or more instructions that cause the 3D printer to print the at least two layers with a fused deposition modeling technique.

19. The one or more non-transitory computer-readable media of claim 12, wherein transmitting one or more instructions to the 3D printer that cause the 3D printer to print the at least two layers and to generate the support post comprises transmitting one or more instructions that cause the 3D printer to print the at least two layers with a photopolymer printing technique.

20. The one or more non-transitory computer-readable media of claim 12, wherein transmitting one or more instructions to a 3D printer that cause the 3D printer to print the at least two layers and to generate the support post comprises transmitting one or more instructions that cause the 3D printer to print the at least two layers with a sintering technique.

21. The one or more non-transitory computer-readable media of claim 12, further comprising:
adding a plurality of support post descriptors to the 3D model, the plurality of support post descriptors being arranged in a staggered formation; and
transmitting one or more instructions to the 3D printer that cause the 3D printer to generate a plurality of support posts and support post cavities based on the plurality of support post descriptors.

22. The one or more non-transitory computer-readable media of claim 21, wherein the staggered formation comprises a circle packing pattern with a threshold thickness of 3D printing material between each support post.

23. A system, comprising:
one or more memories that include a plurality of instructions; and
one or more processors that are coupled to the one or more memories and, when executing the plurality of instructions, are configured to:
identify a portion of a 3D model corresponding to a 3D-printed object to which a support post should be added,
add a support post descriptor to the 3D model that defines a position and at least one dimension of a support post cavity, and
transmit one or more instructions to a 3D printer that cause the 3D printer to print at least two layers of the 3D model that define the support post cavity and to generate the support post in the support post cavity.

* * * * *